United States Patent Office 3,707,479
Patented Dec. 26, 1972

3,707,479
3-AMINO-TETRAHYDRO THIOPHENE-3-CARBOXYLIC ACIDS AND 4-AMINO-TETRAHYDRO THIOPYRAN-4-CARBOXYLIC ACIDS
Gerhard R. Wendt, Havertown, and Donald W. Oliver, Phoenixville, Pa., assignors to American Home Products Corporation, New York, N.Y.
No Drawing. Filed July 23, 1971, Ser. No. 165,711
Int. Cl. C07d 63/04, 65/02
U.S. Cl. 260—327 TH      5 Claims

ABSTRACT OF THE DISCLOSURE

S-oxides of 4-aminotetrahydro-2$\underline{H}$-thiopyran-4-carboxylic acid and 3-amino-tetrahydro-$\overline{3}$-thiophenecarboxylic acid are prepared. The compounds are intermediates for the synthesis of new penicillins.

BACKGROUND OF THE INVENTION

This invention relates to compositions of matter classified in the art of chemistry as the S-oxides of 4-aminotetrahydro-2$\underline{H}$-thiopyran-4-carboxylic acid and 3-aminotetrahydro-3-thiophenecarboxylic acid.

SUMMARY OF THE INVENTION

The invention sought to be patented as a composition of matter is described as residing in the concept of a chemical compound of Formula I

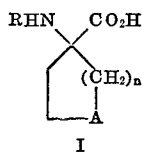

I wherein R is hydrogen and (lower) alkyl, A is

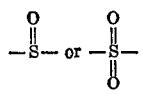

and $n$ is 1 or 2; and the pharmaceutically acceptable acid addition salts thereof.

Preferred embodiments of the compounds of Formula I are those compounds wherein R is hydrogen.

The tangible embodiments of the composition of the invention possess the inherent general physical properties of being solids which decompose at high temperatures, are substantially soluble in water and insoluble in non-polar organic solvents such as ether, benzene, and chloroform.

Examination of compounds produced according to the hereinafter described process reveals, upon infrared and mass spectographic analysis, spectral data confirming the molecular structure hereinbefore set forth. The aforementioned physical characteristic taken together with the elemental analysis, the nature of the starting materials and the mode of synthesis, positively confirm the structures of the compositions sought to be patented.

The tangible embodiments of the invention possess the inherent applied use characteristics of being intermediates for the preparation of penicillins represented by structural Formula II

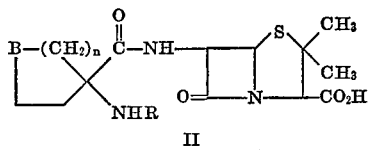

II wherein B is

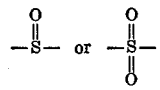

$n$ is 1 or 2, and R is hereinbefore described. Said penicillins have valuable anti-bacterial properties and are fully described in the co-filed and co-pending application Ser. No. 165,171, of Gerhard R. Wendt, Donald E. Clark, and Norman H. Grant, entitled "6-(1-Aminothiocycloalkanoyl Amino)Penicillanic Acids."

A particularly valuable embodiment of the invention is 4-aminotetrahydro-2$\underline{H}$-thiopyran-4-carboxylic acid, 1,1-dioxide which also possesses the inherent applied use characteristics of exerting an anti-ulcer effect as evidenced by a standard pharmacological test. When tested according to the procedure of D. Brodie et al., "Gastroenterology," 15, 1 (1960), as modified by cold stress, the compound protects rats against gastric ulcers at an oral dose of 25 mg./kg.

The manner and process of making and using the invention will now be generally described so as to enable a person skilled in the art to make and use the same as follows: The starting materials for the synthesis of the compounds are 3-tetrahydrothiophenone and tetrahydro-4$\underline{H}$-thiopyran-4-one which are described respectively, by F. Buiter et al., "Recueil Des Travaux Chimigues," 83, 1165 (1964), and by E. Fehnrel, "J. Am. Chem. Soc.," 70, 1814 (1948).

Referring now to Figure I, wherein the compounds are assigned Roman numerals for identification schematically, the sequence of reactions involved in the synthesis of the compounds of Formula I, wherein R is hydrogen, is illustrated by two specific embodiments, namely 3-aminotetrahydro-3-thiophenecarboxylic acid, 1-oxide and 3 - aminotetrahydro - 3 - thiophenecarboxylic acid, 1,1-dioxide.

Figure I

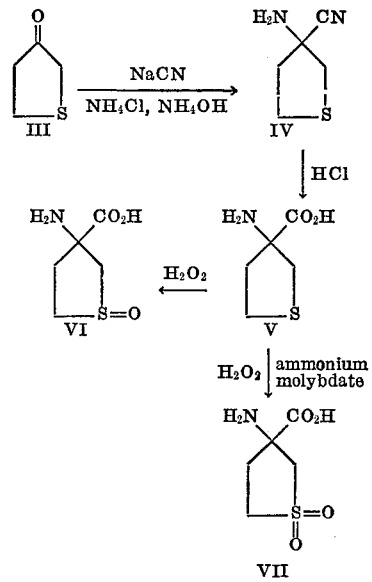

The thioketone (III) is treated with sodium cyanide, ammonium chloride, and ammonium hydroxide in methanol-water (according to the procedure of R. E. Steiger, "Org. Syn.," 22, 13) to yield the aminocarbonitrile (IV). Hydrolysis of the aminocarbonitrile (IV) with concentrated hydrochloric acid gives the 1-aminothiocycloalkanoic acid (V). Oxidation of the 1-aminothiocycloalkanoic acid (V) to the sulfoxide (VI) is accomplished with hydrogen peroxide in glacial acetic acid. Oxidation of V to the sulfone (VII) is carried out with hydrogen peroxide in the presence of ammonium molybdate in dilute perchloric acid. The final products are isolated by conventional procedures.

Compound of Formula I wherein R is lower alkyl can be prepared by substituting an appropriate (lower)alkyl ammonium chloride and (lower)alkyl ammonium hydroxide in place of ammonium chloride and ammonium hydroxide in the first step of the synthesis. The (lower)-alkylaminocarbonitrile so produced can be used in the subsequent reaction steps. For example, substitution of ethylammoniumchloride and ethylammonium hydroxide will afford the (lower)alkylaminocarbonitrile of Formula IV, which can then be hydrolyzed and oxidized to give the corresponding sulfone and sulfoxide.

As used herein the term "lower alkyl" means an aliphatic hydrocarbon radical containing from 1 to 4 carbon atoms, i.e. methyl, ethyl, isopropyl, propyl, and butyl.

The final products of the invention can be converted to their corresponding penicillins by the methods described in the co-pending Wendt et al. application, hereinbefore identified. This is done by converting the amino acid (V) or (VI) to the corresponding N-carboxyanhydride which is then employed to acylate 6-aminopenicillanic acid.

DESCRIPTION OF THE PREFERRED EMBODIMENT

The best mode contemplated by the inventors of carrying out their invention will now be set forth as follows:

EXAMPLE I 3-aminotetrahydro-3-thiophenecarbonitrile, hydrochloride

A solution of 3-tetrahydrothiophenone (20.3 g.) in 32 ml. of anhydrous methanol is added dropwise to a cold, vigorously stirred solution of the following mixture: 10.0 g. of sodium cyanide in 20 ml. of water, 11.8 g. of ammonium chloride in 28 ml. of warm water, and 16.1 ml. of concentrated ammonium hydroxide. The mixture is stirred for 2 hours, allowed to stand at 25° C. for 20 hours, and then heated to 55° C. for 5 hours. After cooling, the reaction mixture is added to 160 g. of crushed ice. The resulting mixture is continuously extracted with ether for 16 hours. The ether extracts are dried and saturated with hydrogen chloride, giving a precipitate, which is recovered by filtration. Yield 18.4 g. Reprecipitation from 600 ml. of methanol-ether (1:5) affords 13 g. of the title compound, M.P. dec. 170–175° C.; mass spectra $M^+=128$.

Analysis for $C_5H_8N_2S \cdot HCl$.—Found (percent): C, 36.35; H, 5.45; N, 17.00; S, 19.78; Cl, 21.25. Calculated (percent): C, 36.47; H, 5.51; N, 17.02; S, 19.47; Cl, 21.33.

EXAMPLE II 3-aminotetrahydro-3-thiophene-carboxylic acid

A solution of 3-aminotetrahydro-3-thiophenecarbonitrile, hydrochloride (5.0 g.) in 50 ml. of concentrated hydrochloric acid is saturated with dry hydrogen chloride gas at 5° C. The saturated solution is allowed to stand at 25° C. in a tightly stoppered flask for 19 hours. The solution is diluted with 50 ml. of water, heated at reflux for 3 hours, and concentrated in vacuo to dryness. The resulting residue is dissolved in 250 ml. of water. The solution is then adjusted to pH 5 with dilute ammonia.

The solution is filtered through a column of 195 ml. (150 meq.) of wet Dowex 50W–X4 ion exchange resin. The column is washed with water until the eluant gives a negative chlorine test with silver nitrate, and then eluted with 800 ml. of 2 N ammonia solution. Concentration to dryness in vacuo of the eluate gives 4.5 g. of crude material which, on recrystallization from 400 ml. of water-acetone (3:5) affords 4.0 g. of the title compound, M.P. dec., 292–293° C.; mass spectra $M^+=147$.

Analysis for $C_5H_9NO_2S$.—Found (percent): C, 40.50; H, 6.16; N, 9.62; S, 22.03. Calculated (percent): C, 40.79; H, 6.16; N, 9.52; S, 21.78.

EXAMPLE III 3-aminotetrahydro-3-thiophene carboxylic acid, 1-oxide

To a stirred suspension of 3-aminotetrahydro-3-thiophene carboxylic acid (5 g.) in 100 ml. of glacial acetic acid is added dropwise 3.6 ml. of 30% hydrogen peroxide. The temperature is maintained at 15–20° C. and not allowed to rise above 20° C. After addition of the hydrogen peroxide, cooling is discontinued, and the mixture allowed to come to 25° C. After 24 hours at 25° C., the reaction mixture is evaporated to dryness. The residue is filtered through a Dowex 50W–X4 cation exchange resin column (180 meq. wet). The column is washed with water and then eluted with 400 ml. of 2 N ammonium hydroxide solution. Evaporation of the eluant gives a residue which crystallizes from water-acetone after several days at −10° C.

The crystals are filtered and dried in vacuo over $P_2O_5$ to obtain 1.7 g. of the title compound, M.P. 260–265° C.;

$$\lambda^{KBr}_{max.} \ 10.12\mu$$

Analysis for $C_5H_9NSO_3$.—Found (percent): C, 36.61; H, 5.70; N, 8.28; S, 19.69. Calculated (percent): C, 36.80; H, 5.56; N, 8.58; S, 19.65.

EXAMPLE IV 3-aminotetrahydro-3-thiophenecarboxylic acid, 1,1-dioxide

To a solution of 3-aminotetrahydro-3-thiophene carboxylic acid (1.47 g.) in 2.5 ml. of 5 M perchloric acid and 15 ml. of water, is added 1 ml. of 0.5 M ammonium molybdate solution. The mixture is stirred and maintained at 25° C. while 3 ml. of 30% hydrogen peroxide is added. The resulting solution is diluted to 25 ml., and, after two hours, diluted with an equal volume of methanol.

The perchloric acid is neutralized with 1.6 ml. of n-amylamine (10% excess). Acetone is added (∼250 ml.) until the product begins to crystallize. After 2 days at 25° C., the material is collected on a sintered glass funnel, washed well with acetone, air dried, and finally dried in vacuo over $P_2O_5$ to obtain 1.1 g. of the title compound, M.P. dec. 233–234° C.;

IR: $\lambda^{KBr}_{max.} \ 7.75, 9.02\mu \ (SO_2)$

Analysis for $C_5H_9NSO_4$.—Found (percent): C, 33.27; H, 5.33; N, 7.64; S, 17.56. Calculated (percent): C, 33.51; H, 5.42; N, 7.82; S, 17.89.

EXAMPLE V 4-aminotetrahydro-2H-thiopyran-4-carbonitrile, hydrochloride

A solution of tetrahydro-4H-thiopyran-4-one (11.6 g.) in 16 ml. of anhydrous methanol is added dropwise to a cold, vigorously stirred solution of the following mixture: 5.0 g. of sodium cyanide in 10 ml. of water; 5.9 g. of ammonium chloride in 14 ml. of water; and 8.05 ml. of concentrated ammonium hydroxide. The resulting solution is allowed to remain at 25° C. for 20 hours. It is finally heated to 55–60° C. for 5 hours. The reaction mixture is cooled and added to a mixture of 80 g. of ice and 20 ml. of concentrated hydrochloric acid (acid to congo red test paper). Crystals begin to form slowly in the cold mixture. The crystals are recovered by filtration. Drying over $P_2O_5$ affords 5.8 g. of the title compound, M.P. dec. 195° C.

Analysis for $C_6H_{10}N_2S \cdot HCl$.—Found (percent): C, 40.20; H, 6.38; N, 15.75; S, 17.97; Cl, 20.12. Calculated (percent): C, 40.33; H, 6.21; N, 15.68; S, 17.94; Cl, 19.84.

The mother liquors are extracted with ether to remove any unchanged ketone. The acidic aqueous layer is made slightly alkaline with concentrated ammonia and extracted again with ether. The combined ether extracts dried over $Na_2SO_4$ and the solvent evaporated under reduced pressure to yield 5.5 of a low melting solid which crystallizes on cooling. The solid is the free base of the title compound, M.P. 43–46° C., $\lambda^{KBr}$ 3.00, 3.46, 4.50, 6.22$\mu$.

Analysis for $C_6H_{10}N_2S$.—Found (percent): C, 50.75; H, 7.19; N, 19.54; S, 22.79. Calculated (percent): C, 50.67; H, 7.09; N, 19.70; S, 22.55.

EXAMPLE VI 4-aminotetrahydro-2H-thiopyran-4-carboxylic acid

A suspension of 4-aminotetrahydro-2H-thiopyran-4-carbonitrile, hydrochloride (5 g.) in 50 ml. of concentrated hydrochloric acid is saturated with dry hydrogen chloride with shaking. After standing for 20 hours at 25° C. in a tightly stoppered flask, the resulting solution is diluted with one volume of water and heated at reflux for 3 hours. The solution is cooled and evaporated to dryness in vacuo. Water (100 ml.) is added and the solution again evaporated to dryness in vacuo. The crude residue is dissolved in 300 ml. of distilled water. The solution is adjusted to pH 5 with dilute ammonia. The solution is then filtered through 220 ml. (wet) of Dowex 50W–X4 (spheres, 50–100 mesh; 1.3 meq./ml.). The column is eluted with water until the eluant no longer gives a positive chlorine test with silver nitrate. The column is then eluted with 800 ml. of 2 N ammonium hydroxide solution. Evaporation of the eluant in vacuo yields 4 g. of crude material, which is recrystallized from 250 ml. of water-acetone (22:3) to afford 2.2 g. of product. Addition of 100 ml. of acetone to the filtrate gives 1.1 g. of additional material for a total of 3.3 g. of the title compound, M.P. dec. 296–297° C.

Analysis for $C_6H_{11}NO_2$.—Found (percent): C, 44.57; H, 6.70; N, 8.50; S, 20.10. Calculated (percent): C, 44.70; H, 6.88; N, 8.69; S, 19.89.

EXAMPLE VII 4-aminotetrahydro-2H-thiopyran-4-carboxylic acid, 1-oxide

A stirred suspension of 4-aminotetrahydro-2H-thiopyran-4-carboxylic acid (5.0 g.) in 100 ml. of glacial acetic acid is treated with 3.6 ml. of 30% hydrogen peroxide (the temperature is not allowed to rise above 20° C.). After standing for 16 hours at 25° C., solid material is collected by filtration, washed with ethanol, and air dried. The crude material is recrystallized from water-acetone (1:5). Filtration and drying of the precipitate over $P_2O_5$ in vacuo at 70° C. to afford 4.9 g. of the title compound, M.P. dec. >300°; mass spectra M+=177.

Analysis for $C_6H_{11}NO_3S$.—Found (percent): C, 40.69; H, 6.19; N, 7.55; S, 17.78. Calculated (percent): C, 40.66; H, 6.26; N, 7.90; S, 18.09.

EXAMPLE VIII 4-aminotetrahydro-2H-thiopyran-4-carboxylic acid, 1,1-dioxide

To a solution of 4-aminotetrahydro-2H-thiopyran-4-carboxylic acid (1.53 g.) in 2.5 ml. of 5 M perchloric acid and 15 ml. of water is added 1 ml. of 0.5 M ammonium molybdate solution. The temperature of the mixture is maintained at 25° C. and 3 ml. of 30% hydrogen peroxide is added dropwise with stirring. The resulting solution is diluted to 25 ml. with water and, after 2 hours, an equal volume of methanol is added.

The perchloric acid is neutralized with 1.6 ml. (10% excess) of n-amylamine. Addition of 250 ml. of acetone gives a white precipitate which is collected on a sintered glass funnel and washed eight times with acetone by resuspension. The product is finally air dried and then dried in vacuo over $P_2O_5$ to obtain 1.16 g. of the title compound, M.P. dec. 284–285° C.;

IR: $\lambda^{KBr}_{max}$. 7.62, 8.87$\mu$

Analysis for $C_6H_{11}NSO_4$.—Found (percent): C, 36.95; H, 5.79; N, 7.09; S, 16.40. Calculated (percent): C, 37.29; H, 5.74; N, 7.25; S, 16.60.

What is claimed is:

1. A compound of the structural formula:

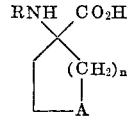

wherein R is hydrogen and lower alkyl, A is

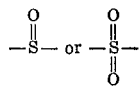

and $n$ is 1 or 2; and the pharmaceutically acceptable acid addition salts thereof.

2. A compound as defined in claim 1 which is 3-aminotetrahydro-3-thiophene carboxylic acid, 1-oxide.

3. A compound as defined in claim 1 which is 3-aminotetrahydro-3-thiophenecarboxylic acid, 1,1-dioxide.

4. A compound as defined in claim 1 which is 4-aminotetrahydro-2H-thiopyran-4-carboxylic acid, 1-oxide.

5. A compound as defined in claim 1 which is 4-aminotetrahydro - 2H - thiopyran-4-carboxylic acid, 1,1-dioxide.

No references cited.

HENRY R. JILES, Primary Examiner

M. M. CROWDER, Assistant Examiner

U.S. Cl. X.R.

260—332.1, 332.2; 424—275